United States Patent
Mao et al.

(10) Patent No.: US 12,556,258 B2
(45) Date of Patent: Feb. 17, 2026

(54) BEAM GRID OPTIMIZATION

(71) Applicant: Nokia Solutions and Networks Oy, Espoo (FI)

(72) Inventors: Xiaomao Mao, Paris (FR); Muhammad Majid Butt, Naperville, IL (US); Ingo Viering, Munich (DE)

( * ) Notice: Subject to any disclaimer, the term of this patent is extended or adjusted under 35 U.S.C. 154(b) by 3 days.

(21) Appl. No.: 18/544,594

(22) Filed: Dec. 19, 2023

(65) Prior Publication Data

US 2024/0214051 A1 Jun. 27, 2024

(30) Foreign Application Priority Data

Dec. 23, 2022 (FI) .................................... 20226163

(51) Int. Cl.
*H04L 5/12* (2006.01)
*H04B 7/06* (2006.01)

(52) U.S. Cl.
CPC ....... *H04B 7/06952* (2023.05); *H04B 7/0639* (2013.01)

(58) Field of Classification Search
CPC .......................... H04B 7/06952; H04B 7/0639
USPC ................ 375/262, 260, 259, 219, 295, 316
See application file for complete search history.

(56) References Cited

U.S. PATENT DOCUMENTS

| 2021/0083737 A1 | 3/2021 | Capdevielle et al. |
| 2021/0320709 A1* | 10/2021 | Nayak ....................... G06N 3/08 |
| 2024/0421887 A1* | 12/2024 | Fryking .................... G06N 7/01 |

FOREIGN PATENT DOCUMENTS

| WO | WO 2020/002127 A1 | 1/2020 |
| WO | WO 2020/135919 A1 | 7/2020 |
| WO | WO-2022/242530 A1 | 11/2022 |

* cited by examiner

*Primary Examiner* — Zewdu A Kassa

(57) ABSTRACT

A method including: obtaining information representative of a current network state; selecting a beam grid in a plurality of candidate beam grids supported by a network device based on the current network state and current beam utility function values determined for one or more beams in the plurality of candidate beam grids; and configuring the network device with the selected beam grid.

19 Claims, 8 Drawing Sheets

BEAM GRID OPTIMIZATION

TECHNICAL FIELD

Various example embodiments relate generally to a method and apparatus for beam grid optimization.

BACKGROUND

The present disclosure is for example applicable to telecommunication systems such as a 5G (fifth generation) network using the 5G NR (New Radio) as radio access technology (RAT) defined by 3GPP or to future generations of telecommunication systems.

The 3GPP NR system is a beam-based access system in which beam grid optimization is an issue for an access node that uses beamforming and/or beam sweeping procedures. A beam grid is set of beams used to provide coverage to UEs in a geographical area.

Heuristic beam grid may for example be used: the beam number and the beam patterns (widths in vertical and horizontal dimension) are predefined offline to achieve a certain signal power at a certain distance and seamlessly cover the whole physical cell area. The disadvantage of heuristic beam grid is that the beams are defined prior to deployment assuming uniform UE distribution, ideal antenna modeling, line of sight beam projection and absence of inter-cell interference. Heuristic beam grid does not account for the UE distribution in the network or the distortion of planned beams coming from imperfect hardware implementation, reflection and diffusion, and so on.

Also the beams after deployed may look very different from what is expected or observed in simulation. As a consequence, there may be in the network cell an empty beam with no UEs or an over-populated beam (e.g. when the sidelobe of one beam is overlapping with another stronger beam such that the stronger beam takes all the UEs from the other beam) where UEs are competing for transmission opportunity.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a method comprises: obtaining information representative of a current network state; selecting a beam grid in a plurality of candidate beam grids supported by a network device based on the current network state and current beam utility function values determined for one or more beams in the plurality of candidate beam grids; configuring the network device with the selected beam grid.

The current beam utility function value of a beam may be based on one or more performances measures and/or beam reports obtained for the considered beam.

The current beam utility function value of a beam may be based on at least one of: a reference signal received power measured by a user equipment, UE, for the beam, a signal-to-interference-plus-noise ratio reported for the beam with a beam index, a number of UEs reporting the beam and QoS requirements of a UE reporting the beam.

Selecting the current beam grid may include performing a random greedy search in the plurality of candidate beam grids to identify a beam grid that meets an optimization criterion based on the current beam utility function values.

Performing a random greedy search may include: randomly selecting beam grids in the plurality of candidate beam grids; computing a current grid utility function value for each of the randomly selected beam grids, wherein a current grid utility function value of a randomly selected beam grid is obtained based on one or more current beam utility function values obtained for the one or more beams included in the randomly selected beam grid; identifying, among the randomly selected beam grids, a beam grid that meets the optimization criterion based on the grid utility function values.

The current grid utility function value of a beam grid may be computed as a function of the current beam utility function values obtained for the one or more beams included in the considered beam grid.

Performing a random greedy search may include: obtaining records associated with the current network state, the records including grid utility function values and corresponding identifiers of beam grids randomly selected during at least one prior random greedy search performed for the same network state; selecting, in the records, a reduced subset of candidate beam grids having the best grid utility function values; wherein randomly selecting beam grids is performed by randomly selecting beam grids in the reduced subset.

The method may comprise: updating the records associated with the current network state by storing a record including a beam grid identifier of a randomly selected beam in association with a grid utility function value determined for the randomly selected beam when the grid utility function value is better than the best grid utility function value obtained during the at least one prior random greedy search.

Randomly selecting beam grids in the plurality of candidate beam grids may include randomly merging or splitting beams of a set of beams supported by the network device to select a first beam grid; repeating the randomly merging or splitting to select further beam grids until at least one stop criterion is met; wherein the at least one stop criterion is met when a given percentage or number of beam grids have been selected and/or when a given time has been consumed for performing the random selection of the beam grids.

The plurality of candidate beam grids may be a reduced subset of the set of all beam grids supported by the network device, wherein the reduced subset is specific to the current network state.

The method may comprise: determining, on the basis of the current network state, a subrange of a range of numbers of beams between one and a maximum number of beams supported by the network device; wherein the randomly selected beam grids are selected in the reduced subset of beam grids having a number of beams in the subrange.

The method may comprise: monitoring the network state to detect a change of network state; when a change of network state is detected, selecting a new beam grid in the plurality of candidate beam grids based on new beam utility function values determined for one or more beams in the plurality of candidate beam grids; configuring the network device with the new beam grid.

The network state may be determined based on at least one of a network load, traffic distribution in a radio coverage area of the network device, time stamp of daily life cycle on working days or weekends.

According to another aspect, an apparatus comprises means for performing a method comprising: obtaining information representative of a current network state; selecting a beam grid in a plurality of candidate beam grids supported by a network device based on the current network state and current beam utility function values determined for one or more beams in the plurality of candidate beam grids; configuring the network device with the selected beam grid.

The apparatus may comprise means for performing one or more or all steps of the method according to the first aspect. The means may include circuitry configured to perform one or more or all steps of a method according to the first aspect. The means may include at least one processor and at least one memory storing instructions that, when executed by the at least one processor, cause the apparatus to perform one or more or all steps of a method according to the first aspect.

According to another aspect, an apparatus comprises at least one processor and at least one memory storing instructions that, when executed by the at least one processor, cause the apparatus to perform: obtaining information representative of a current network state; selecting a beam grid in a plurality of candidate beam grids supported by a network device based on the current network state and current beam utility function values determined for one or more beams in the plurality of candidate beam grids; configuring the network device with the selected beam grid.

The instructions, when executed by the at least one processor, may cause the apparatus to perform one or more or all steps of a method according to the first aspect.

According to another aspect, a computer program comprises instructions that, when executed by an apparatus, cause the apparatus to perform: obtaining information representative of a current network state; selecting a beam grid in a plurality of candidate beam grids supported by a network device based on the current network state and current beam utility function values determined for one or more beams in the plurality of candidate beam grids; configuring the network device with the selected beam grid.

The instructions may cause the apparatus to perform one or more or all steps of a method according to the first aspect.

According to another aspect, a non-transitory computer readable medium comprises program instructions stored thereon for causing an apparatus to perform at least the following: obtaining information representative of a current network state; selecting a beam grid in a plurality of candidate beam grids supported by a network device based on the current network state and current beam utility function values determined for one or more beams in the plurality of candidate beam grids; configuring the network device with the selected beam grid.

The program instructions may cause the apparatus to perform one or more or all steps of a method according to the first aspect.

BRIEF DESCRIPTION OF THE DRAWINGS

Example embodiments will become more fully understood from the detailed description given herein below and the accompanying drawings, which are given by way of illustration only and thus are not limiting of this disclosure.

It should be noted that these drawings are intended to illustrate various aspects of devices, methods and structures used in example embodiments described herein. The use of similar or identical reference numbers in the various drawings is intended to indicate the presence of a similar or identical element or feature.

DETAILED DESCRIPTION

Detailed example embodiments are disclosed herein. However, specific structural and/or functional details disclosed herein are merely representative for purposes of describing example embodiments and providing a clear understanding of the underlying principles. However, these example embodiments may be practiced without these specific details. These example embodiments may be embodied in many alternate forms, with various modifications, and should not be construed as limited to only the embodiments set forth herein. In addition, the figures and descriptions may have been simplified to illustrate elements and/or aspects that are relevant for a clear understanding of the present invention, while eliminating, for purposes of clarity, many other elements that may be well known in the art or not relevant for the understanding of the invention.

One or more example embodiments relate to methods for beam grid optimization.

Figure 1:
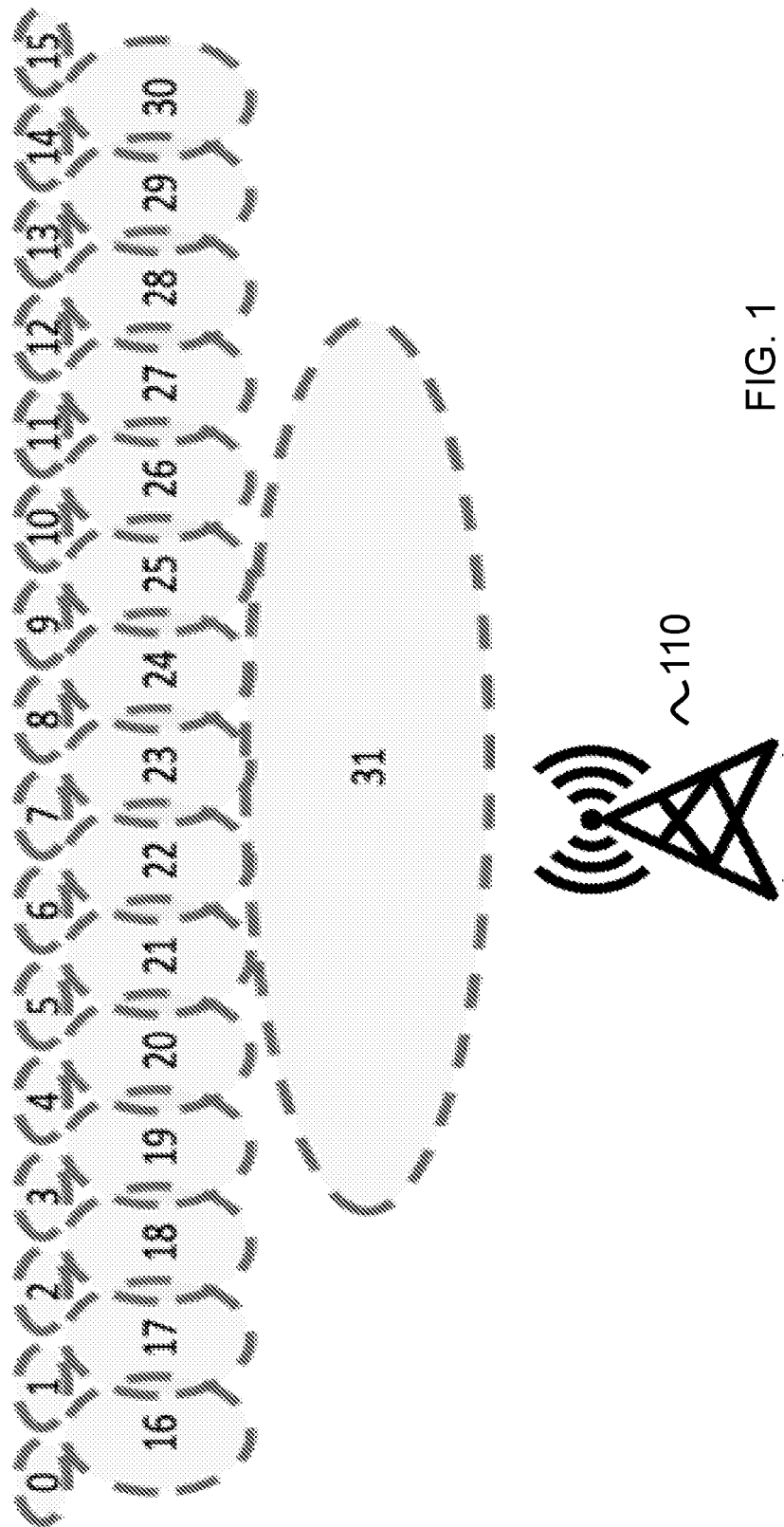
FIG. 1 illustrate an example of a radio cell coverage using beam grids configured with several layers of beams according to an example.

FIG. 1 illustrate an example of a radio cell coverage using beam grids configured with three layers of beams by a network device 110 (e.g. an access node or base station 110).

As illustrating by FIG. 1, three layers of beams may be used, with the outer layer including narrow beams 0 to 15 targeting the cell edge area where user equipments (UEs) require high beamforming gain to combat the pathloss and the inner layer including only one big fat beam 31 serving cell center area where pathloss is less critical. Beams in one layer may be directed uniformly with a certain level of overlapping between two neighbor beams to ensure coverage.

Beam grid optimization includes a determination of the beam number, beam width and beam direction so as to cover the whole radio cell area. One target may be to define the beam grid such that system performance, e.g. SINR for the individual UEs, can be maximized while system overhead (e.g. reference signaling overhead and latency for beam management) can be improved.

Because using more beams in the beam sweeping phase generally means longer sweeping time and more signaling overhead, one objective may be to avoid using a beam in beam grid if this beam is not used by any (or very few) UE.

In addition, another objective might be to serve a UE with a beam producing more beamforming gain (thus high SINR) such that its buffer can be cleared faster. This is particular helpful if the associated beam is needed for many other UEs and only one beam at a time can be served. Because in this way, the other UEs have better chance to be served faster and the system performance will therefore be improved.

A method for beam grid optimization is proposed for a network device (e.g. an access node associated with a radio cell) with the objective to achieve a tradeoff between system performance and overhead reduction.

A utility function is defined for a beam. Information representative of a current network state is obtained. Then a beam grid is selected in a plurality of candidate beam grids supported by the network device based on the current network state and current beam utility function values determined for one or more beams in the plurality of candidate beam grids.

The utility function allows to assign to each beam a quantity representative of the utility and/or usage of the considered beam. The current beam utility function value of a beam may be determined on the basis of one or more performances measures and/or UE beam reports obtained for the considered beam. The current beam utility function value of a beam may for example be based on at least one of: a reference signal received power (RSRP) measured by one or more UEs for the beam, a signal-to-interference-plus-noise ratio (SINR) reported for the beam with a beam index, number of UEs reporting the beam, QoS requirements of one or more UEs reporting the beam, etc.

The utility function is used to select a beam grid (e.g. the best beam grid), by implicitly taking into account various network parameters having an impact on the beam reports/performance measures. These network parameters include for example: the UE geographical distribution in a radio coverage area, the imperfect hardware implementation, the non-LoS reflection in the radio cell but also, optionally, the inter-cell interference, etc. By combining or eliminating some beams to define the best beam grid, it is possible to suppress the empty beams or the over-populated beams encountered by using heuristic beam grid deployment.

The network device may be configured to collect the beam reports from all UEs in the radio coverage area and to determine beam utility function value for each beam supported by the network device.

Then randomly selected beam grids (each beam grid using either a single beam or a beam combination/bundle) are evaluated to find a best beam grid based on the beam utility function values obtained for the one or more beams used in each evaluated beam grid.

The evaluation of a beam grid is performed by using a grid utility function based on one or more current beam utility function values obtained for the one or more beams included in the considered beam grid.

A grid utility function value may be computed as a function (e.g., sum or average) of the current beam utility function values obtained for the one or more beams included in the considered beam grid.

The best beam grid may be for example the one which has the optimum average beam utility, that is the one which tradeoffs between system overhead (number of beams in the grid) and system KPI (e.g., latency, throughput) in the network based on UE access/linked quality—access opportunity and RSRP values.

An identifier of the best beam grid may be stored and the network device may be configured with this best beam grid as long as the network state does not change.

The network state may be monitored to detect a change of network state. To detect a change of network state, changes can be quantified: for example, if a change measured for a KPI is greater than a preconfigured threshold, then a network is detected. Discrete network states may be considered for monitoring the changes of network state such that a change of network state is detected if a change, quantified by a given parameter, is greater than a preconfigured threshold. Stable network states may require that a change of beam grid configuration is not necessary as long as the network state does not change.

The network state may be determined for example based on a network load associated with the network device. The network load may be quantified as a sum of rate and/or throughput requirements by all the UEs in a radio area covered by all the beams sent by the network device. Several levels of network loads may be defined to be able to quantify the network states and define network states corresponding to the network load levels.

Timestamps of daily life cycle on working days or weekends may also be used to monitor the network state and detect a change of network state.

A mapping between network states and one or more beam grids may be generated to allow the selection of a best beam grid within a reduced set of beam grids based on a current network state.

A given network state may for example be mapped at a given time to a reduced set of beam grids, and the reduced set of beam grids associated with a network state may be updated, e.g. refined, in an iterative manner, e.g. each time the given network state is detected again. A reduced set of beams is a set of beam grids that does not include all beam grids supported by the network device.

The best beam is searched in a search space defined by a plurality of candidate beam grids. The best beam grid is searched on the basis of an optimization criterion applied to the grid utility function values. The best beam grid is then used as current beam grid and the network device is configured with the current beam grid.

Searching for the best beam grid may include performing a random greedy in a plurality of candidate beam grids to identify a beam grid that meets an optimization criterion based on the current beam utility function values. A random greedy search may include: randomly selecting beam grids in the plurality of candidate beam grids and computing a current grid utility function value for each of the randomly selected beam grids. The current grid utility function value of a randomly selected beam grid may be obtained based on one or more current beam utility function values obtained for the one or more beams included in the considered randomly selected beam grid. The best beam grid is identified among the randomly selected beam grids: the best beam grid is one beam grid that meets the optimization criterion based on the grid utility function values.

At the first iteration, the best beam grid is searched using a random greedy search in an initial search space and mapped to the current network state. The initial search space may be reduced at each next iteration: when the network is again in the same network state, the random greedy search may be performed again for this given network state, starting from a reduced search space.

At a first iteration for a given network state, the initial search space may for example correspond to a full beam grid set including all beam grids supported by the network device, whatever the number of beams in the beam grid. Therefore, the maximum possible number of beams supported by the network device (e.g. the number of the antenna elements) may be considered at the first iteration. Only beams with uniform DFT (Discrete Fourier Transform) may be used.

A mapping table may be generated for storing the results of one or more random greedy searches. The mapping table may map a particular network state to evaluated beam grids. The mapping table can be used for directly mapping a network state to a particular entry of the table and select associated beam grids.

Records of the mapping table may be used to store, for each network state, beam grid identifiers of beam grids evaluated for the network state in associations with grid utility function values obtained based on current beam utility values computed for beams when the network is in the network state.

Example embodiments of a method for performing a first random greedy search (e.g. during a first iteration) are described by reference to FIG. 3A.

At a next iteration performed when the network is again in the given network state, part or all records associated with the current network state may be reused to reduce the search space or to prioritize the search, for example by selecting, in the records, a reduced subset of candidate beam grids more likely to have the best grid utility function values and performing the random greedy search in this reduced subset.

For example, the search may be limited to a reduced subset of candidate beam grids such that only those beam grids in the records are evaluated again using current beam utility function values obtained for beams which are more likely to result in largest utility function. The best candidate beam grids may be selected based on statistics (e.g. the statistical distribution of the grid utility function values in the records associated with the current network state): the best beam grid may correspond to a given percentage (e.g. 10%) of the beam grids that have the best grid utility function value in the statistical distribution. Alternatively, random sampling can be done using stochastic algorithms like Simulated Annealing and genetic algorithms. Randomly selecting beam grids may then be performed during the random greedy search by randomly selecting beam grids (e.g. in a prioritizing way) in the reduced subset of candidate beam grids. Then other beam grids that are not in the reduced subset may be randomly selected and evaluated.

After the evaluation of the beam grids of the reduced subset, the records associated with the current network state may be updated by storing some or all grid utility function values newly evaluated in association with beam grid identifiers. The stored grid utility function values may correspond to the best candidate beam grid evaluated during the current random greedy search. Alternatively the records for beam grid identifiers are updated/replaced only if the newly evaluated grid utility function value is better than the previously 'best' grid utility function value evaluated during the prior random greedy search. In one or more embodiments, for each randomly selected beam grid, the beam grid identifier is stored in a record in association with its grid utility function value only if this grid utility function value is better than the previously known best grid utility function value stored in the records for the same network state.

These records may then be used iteratively as described herein for further executions of the random greedy search performed for the same network state. In this way the records associated with a network state may include only a reduced subset of beam grids that have been found over the iterations to be the best beam grids. This will reduce the computation time for the evaluation of the reduced subset of beam grids.

Example embodiments of a method for performing a random greedy search based on the results of a prior random greedy search are described by reference to FIG. 3B.

The beam utility function is used to quantify the usage of a beam in a beam grid. As an example, the beam utility function can be defined as a function of the number of UE beam reporting for the beam and the associated RSRP value on the basis of the below formula:

$$U_i = f(|M_i|, \{r_j\}_{j \in M_i}) = |M_i| + \frac{1}{|M_i|} \sum_{j \in M_i} 1/r_j$$

where, $M_i$ is the set containing all the UE reporting for beam index I;

$|M_i|$ is the number of UE beam reporting for beam index i, and $r_j$ denotes the RSRP value for the jth beam report in set $M_i$.

Taking into consideration the beam indexes as well as the RSRP value reported by the UEs, the utility function of beam i reflects not only the geographically distribution of the UEs within the beam coverage area but also the antenna hardware distortion at both base station and UE sides. When the number of UE beam reporting for a beam is high and the associated RSRP values are low, the beam utility is high, which means that a lot of UEs try to access using the beam while the quality of the access links are bad.

Note that the utility function can also consider other metrics, such as UE reported CQI (which accounts for not only the UE receiving power but also the interference UE observes), traffic type, etc. Besides, weighting coefficients can be added to adjust the impact for different factors.

This example implementation uses here the two most important UE measurements: beam reporting number and the associated RSRP values.

For a beam grid (corresponding either to a single beam or a combination/bundle of several beams), a grid utility function may be defined on the basis of the beam utility function values of the one or more beams used in the beam grid.

For example, for two beams in a beam grid that are combined into one fat beam, we label them with one beam index and project them on one SSB or CSI-RS resource, same weights but with half power. The resulted grid utility function for the beam grid corresponding to the fat beam can be calculated using the same formula but with the number of beam reporting combined and the RSRP value halved as the transmitted power is halved. Specifically, if beam i and beam p are combined into one fat beam, the beam utility function values are computed as follows:

$$U_i = f(|M_i|, \{r_j\}_{j \in M_i}) = |M_i| + \frac{1}{|M_i|} \sum_{j \in M_i} 1/r_j$$

$$U_p = f(|M_p|, \{r_q\}_{q \in M_p}) = |M_p| + \frac{1}{|M_p|} \sum_{q \in M_p} 1/r_q$$

To calculate the grid utility function value for the combined fat beam k, the average between the beam utility function values may be computed with half the RSRP values:

$$U_k = f\left(|M_i, M_p|, \{r_l\}_{l \in \{M_i M_p\}}\right) =$$

$$|M_i| + \frac{1}{|M_i|}\sum_{j \in M_i} 2/r_j + |M_p| + \frac{1}{|M_p|}\sum_{q \in M_p} 2/r_q$$

When two beams have very small number of UEs in their coverage area, combining/bundling beams into one fat beam results in one empty beam (beam(s) is (are) removed from the system by switching off corresponding antenna elements), and this will not impact the grid utility of the beam grid but we do have less system overhead as one beam is saved from beam sweeping, so less reference signal resource and less sweeping latency. For example, when two adjacent beams have low number of UEs in their coverage area, one of the two adjacent beams is removed (switch off) and the coverage of the other one is increased.

When a given beam in a beam grid has large utility function value, beam splitting may also be used: one more beam can be added in the beam grid, resulting in providing coverage to some of the UEs covered by the given beam, then the utility function value of the given beam decreases and the newly added beam(s) has (have) a non-zero utility function value.

On the other hand, when two beams have high utility function values, combining/bundling them will result in one beam with even higher utility function, which means more UEs are fighting to use the fat beam and likely less UEs will clear their buffer soon.

Actually, the above grid utility function takes into consideration both the system resource for beam management and the UE access/link quality, combining or splitting the beams results in adjusting the tradeoff between the two targets, system overhead reduction and system throughput performance.

At a given instant, a grid utility function value may be computed as a function (e.g. the sum or average) of the current beam utility function values obtained for the one or more beams included in the considered beam grid.

One or more weighting coefficients may be applied in the above example utility function to adjust the tradeoff between system throughput performance and overhead reduction.

Performing a random greedy search in a search space corresponding to a plurality of candidate beam grids may be performed by considering the maximum possible number of beams (usually the number of antenna elements) (and optionally uniform DFT beam grid) and finding all possible combinations of beams to generate the complete search space.

However to reduce the search space, beam grids to be evaluated are randomly sampled at smaller rate in the complete search space.

Based on the maximum possible number of beams (usually the number of antenna elements) and uniform DFT beam grid, two or several beams may be randomly combined into one beam to adjust the number of beams as well as the beam pattern of the beam grid and define a beam grid to be evaluated. Different beam combinations (i.e. beam bundles) are evaluated for a given number of beams in a bundle by computing the grid utility value for each bundle. At the end, only one best beam grid that optimizes a criterion based on the grid utility value is selected: this best beam has the maximized utility.

An example with a maximum of 4 beams in a beam grid is described. Thus the possible radio coverage options will use 1 beam, 2 beams, 3 beams or 4 beams.

There are 4 ways how one beam can cover the whole radio area since any of the 4 beams could be used and gives the same beam utility value, equal to the grid utility value. If only one beam is being used to provide coverage to all UEs, it is the same beam whatever identifier is given to it. Antenna elements are adjusted to provide coverage. There are 6 ways how 2 beams can be combined. Each combination is evaluated using a same grid utility function but may provide different grid utility values.

There are 4 ways how 3 beams can be combined. Each combination is evaluated using a same grid utility function but may provide different grid utility values.

There is one way how 4 beams could be combined to cover full area.

In total, there are 15 possible combinations/bundles for 4 beams:

$$C_1^n + C_2^n + C_3^n + C_4^n = 4 + 6 + 4 + 1 = 15 \text{ for } n = 4.$$

The number of total combinations with n total beams is given by the general formula:

$$C_1^n + C_2^n + C_3^n \ldots C_n^n$$

We select the best combination/bundle giving the best grid utility value.

That is, for a particular network load/state, by using one beam, the best beam is selected. The best combination is likewise selected when 2, 3, and 4 beams are combined. Finally, the number of beams that gives the best grid utility value over all evaluated combinations is selected as shown in the example illustrated by Table 1 below for network load levels L1, L2, L3.

TABLE 1

| Network state | Subsets of candidate beam grids | Best grid utility function value over the subset | Best number of beams and best beam grid |
|---|---|---|---|
| L1 | Subset C1 of size 4 with N = 1 beam = {1}, {2}, {3}, {4} | u11 | $B_{L1}$ is the best number of beams |
| | Subset C2 of size 6 with N = 2 beams = {1, 2}, {2, 3}, {3, 4}, {4, 1}, {2, 4}, {1, 3} | u12 | $BID_{L1}$ is the best bundle |
| | Subset C3 of size 4 with N = 3 beams = {1, 2, 3}, {2, 3, 4}, {3, 4, 1}, {1, 2, 4} | u13 | |

TABLE 1-continued

| Network state | Subsets of candidate beam grids | Best grid utility function value over the subset | Best number of beams and best beam grid |
|---|---|---|---|
| | Subset C4 of size 1 with N = 4 beams = {1, 2, 3, 4} | u14 | |
| L2 | Subset C1 of size 4 with N = 1 beam = {1}, {2}, {3}, {4} | u21 | $B_{L2}$ is the best number of beams |
| | Subset C2 of size 6 with N = 2 beams = {1, 2}, {2, 3}, {3, 4}, {4, 1}, {2, 4}, {1, 3} | u22 | $BID_{L2}$ is the best bundle |
| | Subset C3 of size 4 with N = 3 beams = {1, 2, 3}, {2, 3, 4}, {3, 4, 1}, {1, 2, 4} | u23 | |
| | Subset C4 of size 1 with N = 4 beams = {1, 2, 3, 4} | u24 | |
| L3 | Subset C1 of size 4 with N = 1 beam = {1}, {2}, {3}, {4} | u31 | $B_{L3}$ is the best number of beams |
| | Subset C2 of size 6 with N = 2 beams = {1, 2}, {2, 3}, {3, 4}, {4, 1}, {2, 4}, {1, 3} | u32 | $BID_{L3}$ is the best bundle |
| | Subset C3 of size 4 with N = 3 beams = {1, 2, 3}, {2, 3, 4}, {3, 4, 1}, {1, 2, 4} | u33 | |
| | Subset C4 of size 1 with N = 4 beams = {1, 2, 3, 4} | u34 | |

Note that in this example, the evaluated reduced subset of candidate beam grid includes all the subsets C1, C2, C3 and C4 for each network load. But the reduced subset of candidate beam grid is generally different for each network load because the evaluated combinations are randomly selected.

When the total number of beams is low (e.g. n=4 beams), all beam grids may be evaluated. But when the total number of beams is high (e.g. n=32 beams), a reduced subset of candidate beam grid is found by random sampling of beam grids and evaluating only the randomly selected beam grids.

Although a random sampling is performed in the full search space including all beam combinations, it may be very time consuming and inefficient to achieve near optimal solution. An approximate step may be applied to further reduce the search space to beam grids having a smaller number of beams in a subrange of the full range [1, n] of number of beams.

To reduce the search space, each load level may be mapped to a reduced search space corresponding to subsets of beam grids having a beam number in a subrange of the full range [1, n] of number of beams as illustrated by Table 1. For example, for load level L1, the reduced search space may be limited to subsets C1 and/or C2 only (using only beam grids with 1 or 2 beams). For the load level L2, the reduced search space may be limited to subsets C2 and C3 (using only beam grids with 2 and 3 beams). For the load level L3, the reduced search space may be limited to the subsets C3 and C4 (using only beam grids with 3 and 4 beams). This reduces search space considerably.

To achieve such reduction, the network state (e.g. network load) may be compared to thresholds to be able to map the network state to predefined states (e.g. load levels). For instance:

$$\text{if load} < T1 \Rightarrow \text{load level} = L1$$
$$\text{if } T1 < \text{load} < T2 \Rightarrow \text{load level} = L2$$
$$\text{if load} > T2 \Rightarrow \text{load level} = L3.$$

where thresholds T1 and T2 are configured by the network such that T2>T1. As a numerical example, T1=20% of maximum load expected, T2=50% of maximum load expected.

This can be generalized to any number of load levels: instead of just using two thresholds to have low, medium and high load levels L1 to L3, it is possible to have more discrete granularity for evaluating the load levels by adding more thresholds following the same procedure as described above.

For example for n=32 beams, we have a total of n=32 subsets C1, C2, . . . , to C32 where each subset includes only the beam grids having a given number of beams, such that $C1=C_1^{32}$, $C2=C_2^{32}$, . . . , $C32=C_{32}^{32}$. As for the 4 beams case, the 3 load levels can be mapped to a subset of search space such that:

the low load level L1 is mapped to a reduced search space consisting for example of the union of subsets C1-C12;
  the medium load level L2 is mapped to a reduced search space consisting for example of the union of the subsets C8-C20;
  the high load level L3 is mapped to a reduced search space consisting for example of the union of subsets C20-C32.

These example divisions into reduced searched space are approximate example solutions. The determination of the reduced search spaces to be used for each load level can be determined based on the grid utility function values in the records associated with the current network state. For example by selecting the best subsets corresponding to the subsets that include the beam grids with the best grid utility function values and identifying at least one subrange of the range [1, n] corresponding to the best subsets to generate a reduced search spaces as the union of the subsets having a beam number in the at least one subrange.

For each load level, a reduced subset of candidate beam grids may thus be selected as reduced search space and the random greedy search is performed in the reduced subset. Combinations of beams or beam bundles are selected randomly and not all combinations need to be evaluated in the reduced subset. For each randomly selected beam grid, the beam grid identifier may be stored in a record in association with its grid utility function value if better than the previously known best grid utility function. For each load level, the best beam grid is the one that provides the highest utility.

It is to be noted that since the beam reports for a given beam may vary over time, the beam utility function values of a given beam may vary over time such that a grid utility function based on the given beam may vary over time. Thus for each random greedy search, current beam utility function values obtained for a current time step are used to evaluate the current grid utility function values.

In execution phase, when the network state is monitored and is again in a given network state, a reduced search space is selected based on the network state. For example, by selecting number(s) of beams that gives best grid utility based on mapping table. Example embodiments of a method for monitoring the network state are described by reference to FIG. 2.

Note that while only the beam grids in a subset of randomly selected beam grids are evaluated for generating the mapping table, a random greedy search can be invoked again after some time to evaluate even more beam grids and update the mapping table and records associated with a given network state, but the starting point for searching the best available bundle may be the records obtained as the results from the previous evaluation based for the random selected beam grids.

A newly evaluated beam grid may be taken into account and stored in a record associated with a network state only if the evaluated beam grid provides better grid utility function value than the one already stored in the records for the best beam grid associated with the considered network state.

Figure 2:
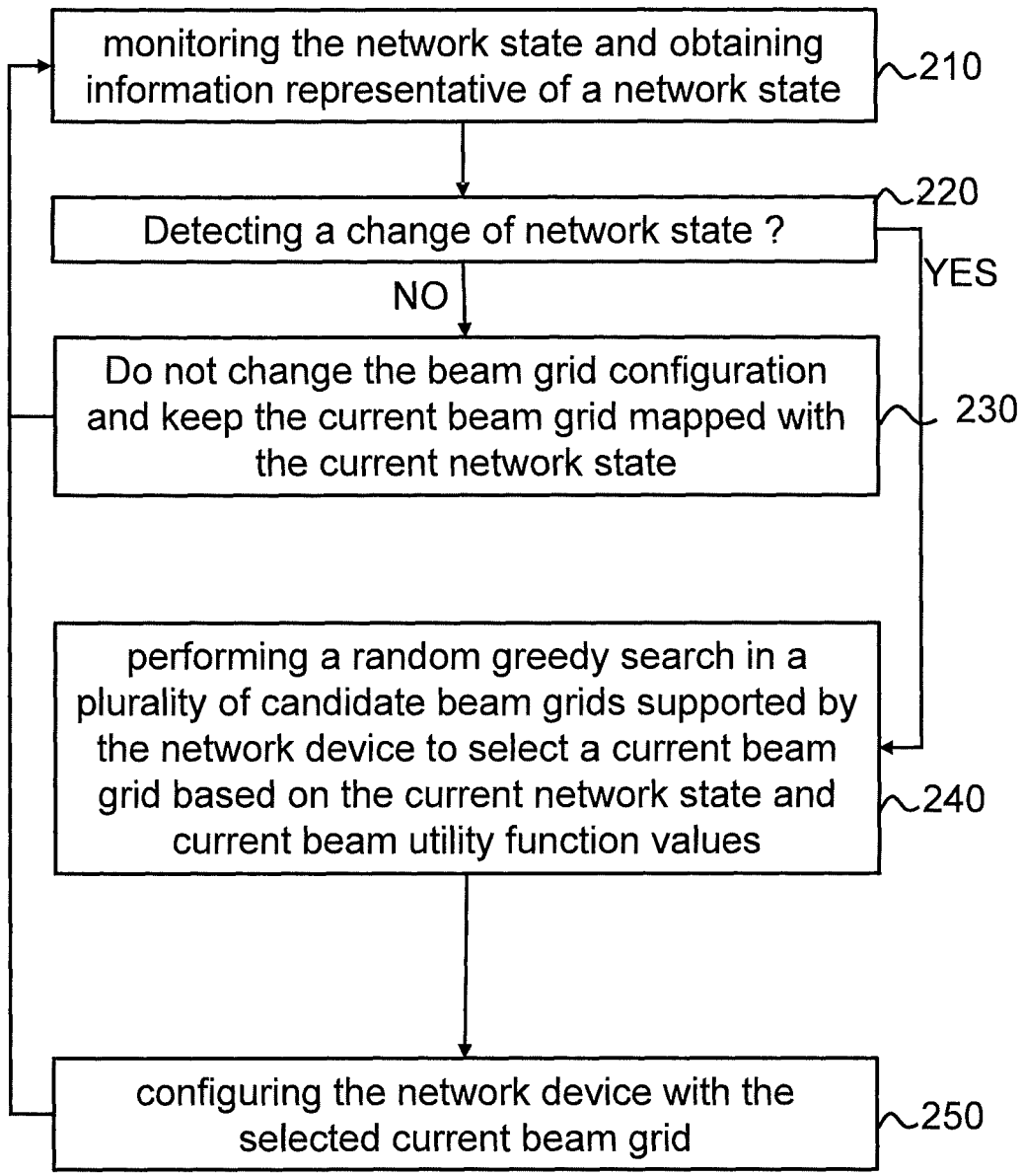
FIG. 2 shows a flowchart of a method for monitoring a network state according to one or more example embodiments.

FIG. 2 shows a flowchart of a method for monitoring a network state according to one or more example embodiments.

The steps of the method may be implemented by a network device according to any example described herein. While the steps are described in a sequential manner, the man skilled in the art will appreciate that some steps may be omitted, combined, performed in different order and/or in parallel.

In step 210, the network state is monitored to get network state information (e.g. load information) representative of a network state.

In step 220, it is determined on the basis of the network state information whether a change of network state has occurred. If a change of network state is detected, step 240 is executed after step 220. Otherwise step 210 is executed after step 220.

In step 230, the current beam grid configuration is not changed and remains the current beam grid mapped with the current network state. Step 210 is executed after step 230.

Alternatively, in step 230, after a given time period during which no network state change has been detected, a random greedy search is performed gain for the current network state. The random greedy search is performed in a plurality of candidate beam grids supported by the network device to select again a best beam grid based on the current network state and current beam utility function values. The network device is then configured with the newly selected best beam grid.

In step 240, a random greedy search is performed in a plurality of candidate beam grids supported by the network device to select a best beam grid based on the current network state and current beam utility function values. Step 250 is executed after step 240.

Example embodiments of a method for performing a random greedy search are described by reference to FIGS. 3A, 3B and 5.

In step 250, the network device is configured with the current beam grid selected in step 240 and the current beam grid is mapped with the current network state.

Figure 3A:
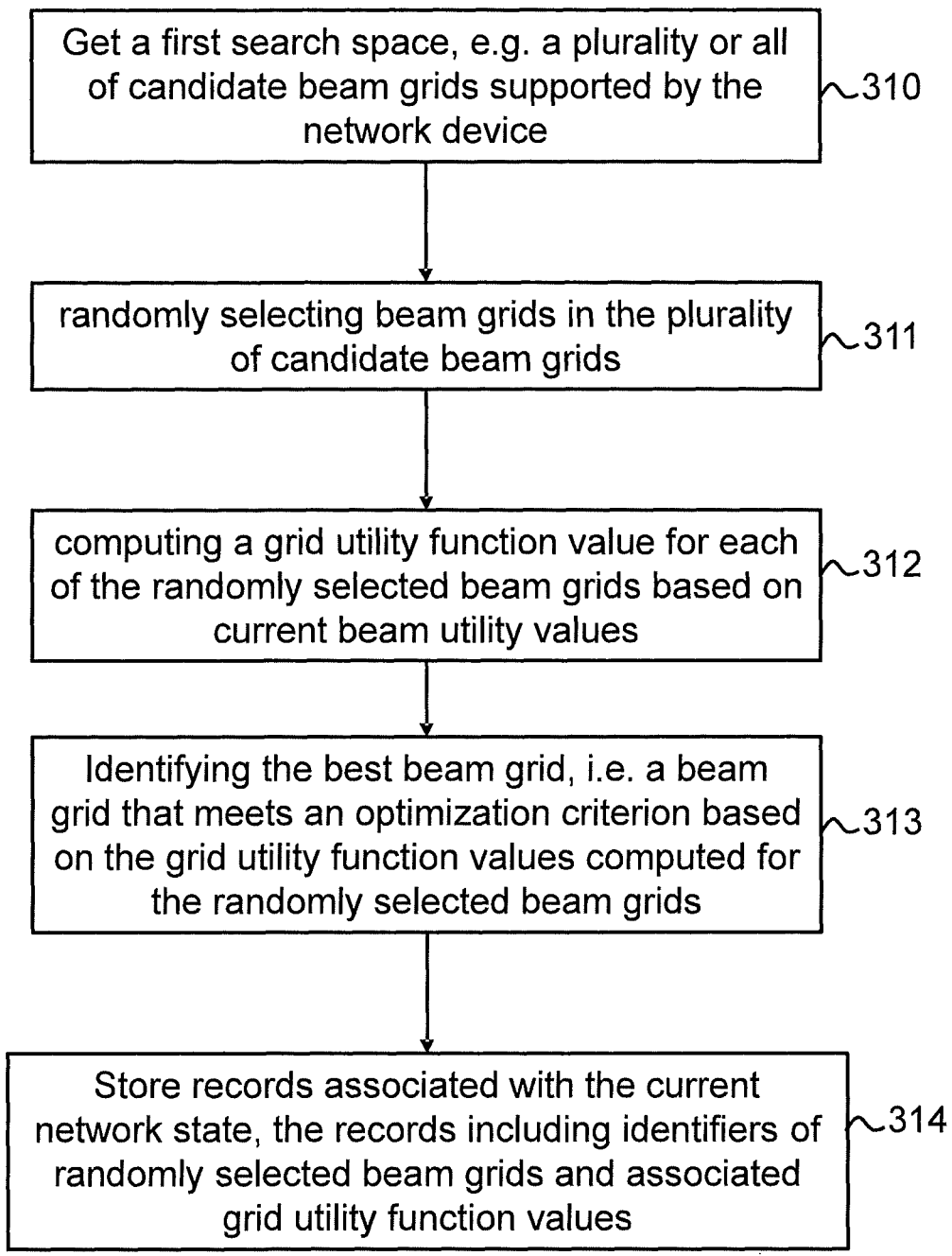
FIG. 3A shows a flowchart of a method for performing a first random greedy search according to one or more example embodiments.

FIG. 3A shows a flowchart of a method for performing a random greedy search according to one or more example embodiments.

The steps of the method may be implemented by a network device according to any example described herein. While the steps are described in a sequential manner, the man skilled in the art will appreciate that some steps may be omitted, combined, performed in different order and/or in parallel.

In step 310, an initial search space is obtained. The initial search space corresponds to a plurality or all of candidate beam grids supported by the network device.

In step 311, a random greedy search is performed by randomly selecting beam grids in the initial search space. Example embodiments of a method for by randomly selecting beam grids are described by reference to FIG. 4.

In step 312, a grid utility function value is computed for each of the randomly selected beam grids based on current beam utility values.

In step 313, the best beam grid is identified. The best beam grid is a beam grid that meets an optimization criterion based on the grid utility function values computed for the randomly selected beam grids in step 312.

In step 314, records are stored in association with the current network state, the records including beam grid identifiers of the randomly selected beam grids and associated grid utility function values.

Figure 3B:
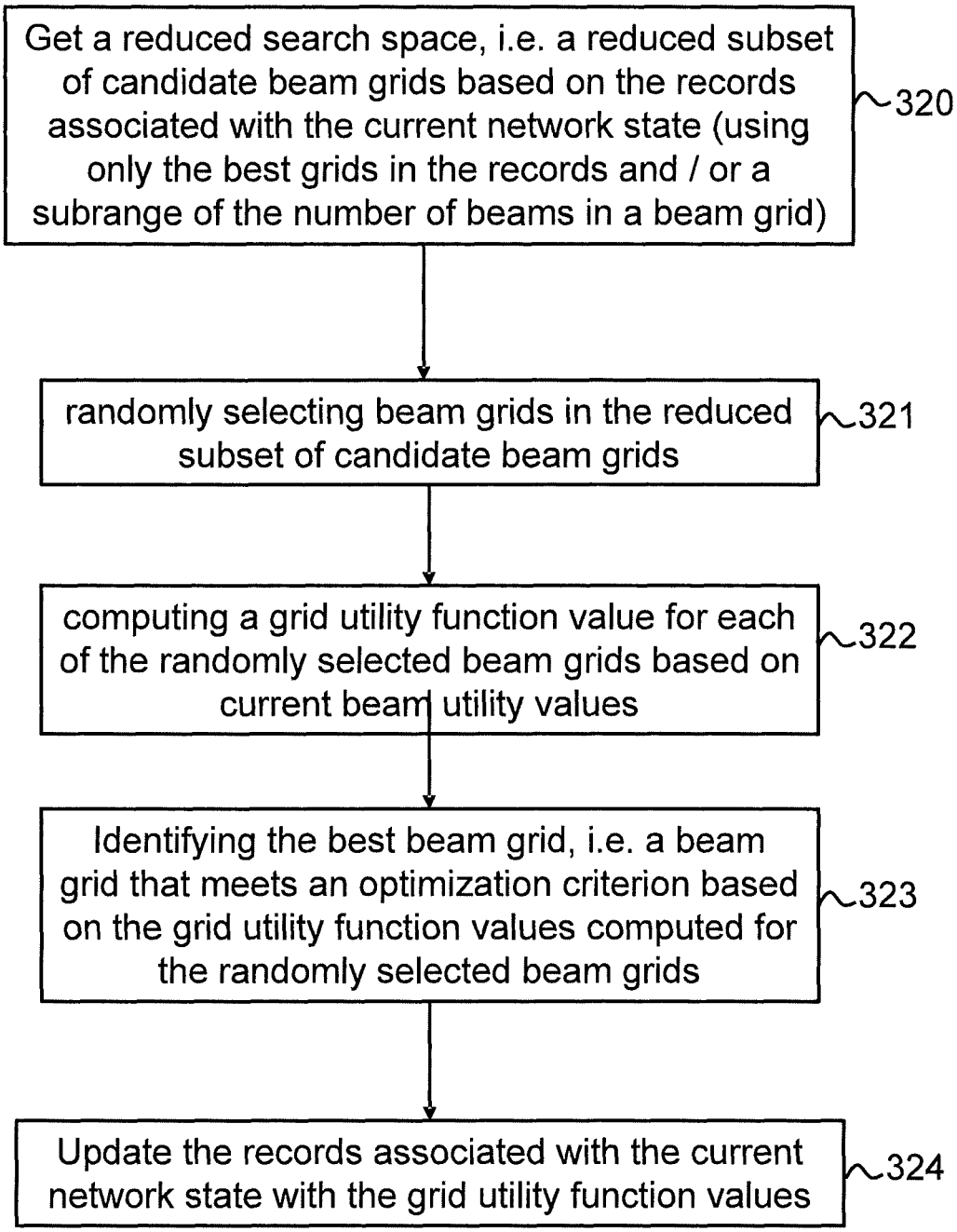
FIG. 3B shows a flowchart of a method for performing a further random greedy search based on the results of a prior random greedy search according to one or more example embodiments.

FIG. 3B shows a flowchart of a method for performing a random greedy search based on results obtained for a prior random greedy search according to one or more example embodiments.

The steps of the method may be implemented by a network device according to any example described herein. While the steps are described in a sequential manner, the man skilled in the art will appreciate that some steps may be omitted, combined, performed in different order and/or in parallel.

In step 320, a reduced search space associate with the current network state is obtained. The reduced search space is a reduced subset of candidate beam grids that is determined based on the records resulting from at least one prior random greedy search performed for the current network state (e.g. using only the best grids in the records and/or a subrange of the number of beams in a beam grid).

In step 321, a random greedy search is performed by randomly selecting beam grids in the reduced subset of candidate beam grids. Example embodiments of a method for by randomly selecting beam grids are described by reference to FIG. 4.

In step 322, a grid utility function value is computed for each of the randomly selected beam grids based on current beam utility values.

In step 323, the best beam grid is identified. The best beam grid is a beam grid that meets an optimization criterion based on the grid utility function values computed in step 322 for the randomly selected beam grids and the grid utility function value computed for the best beam grid in the records.

In step 324, the records associated with the current network state are updated with beam grid identifiers and grid utility function values computed for some or all of the beam grids randomly selected in step 321. A beam grid evaluated in step 322 may be for example taken into account and stored in a record associated with the network state only if the evaluated beam grid provides better grid utility function value than the one already stored in the records for the best beam grid associated with the current network state.

Figure 4:
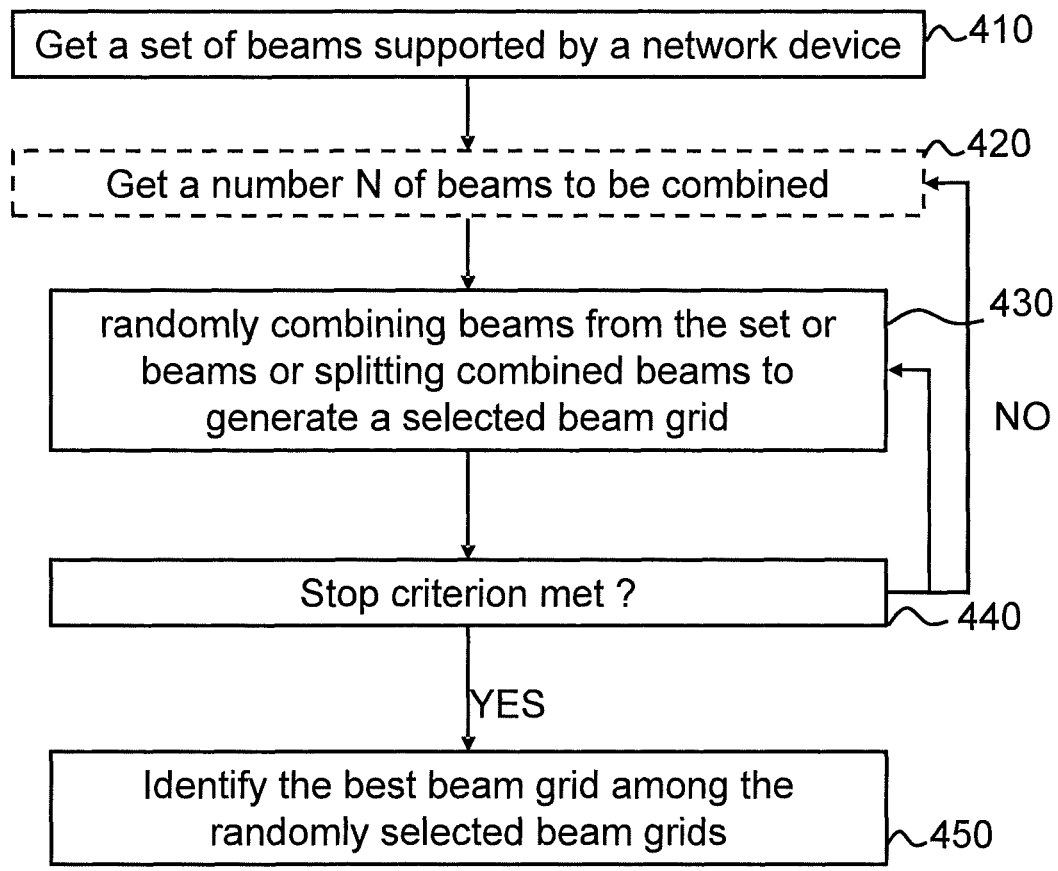
FIG. 4 shows a flowchart of a method for randomly selecting beam grid according to one or more example embodiments.

FIG. 4 shows a flowchart of a method for randomly selecting beam grid according to one or more example embodiments.

The steps of the method may be implemented by a network device according to any example described herein. While the steps are described in a sequential manner, the man skilled in the art will appreciate that some steps may be omitted, combined, performed in different order and/or in parallel.

In step 410, a set of beams supported by a network device is obtained.

In step 420, optionally at least one number N of beams is selected.

In step 430, a random search is performed by randomly combining and/or splitting beams from the set or beams to generate a selected beam grid. If at least one number N of beams has been selected in step 420, the random search is performed in a reduced search space corresponding to the beam grids having a number of beams corresponding to one of the selected number(s) of beams.

For random selecting of a beam grid in a plurality of candidate beam grids, a genetic algorithm or simulated annealing can be used.

In step 440, it is determined whether at least one stop criterion met. For example, the stop criterion is met when a maximum number of randomly selected beam grids has been selected. For example, the stop criterion is met when a given percentage of beam grids have been selected. For example, the stop criterion is met when a given time has been consumed for performing the random selection of the beam grids. Several stop criterions may be combined. If the at least one stop criterion is met, the step 430 or 420 is executed after step 440. Otherwise step 450 is executed after step 440.

In step 450, the best beam grid is identified among the randomly selected beam grids on the basis of grid utility function values computed for the randomly selected beam grids.

Figure 5:
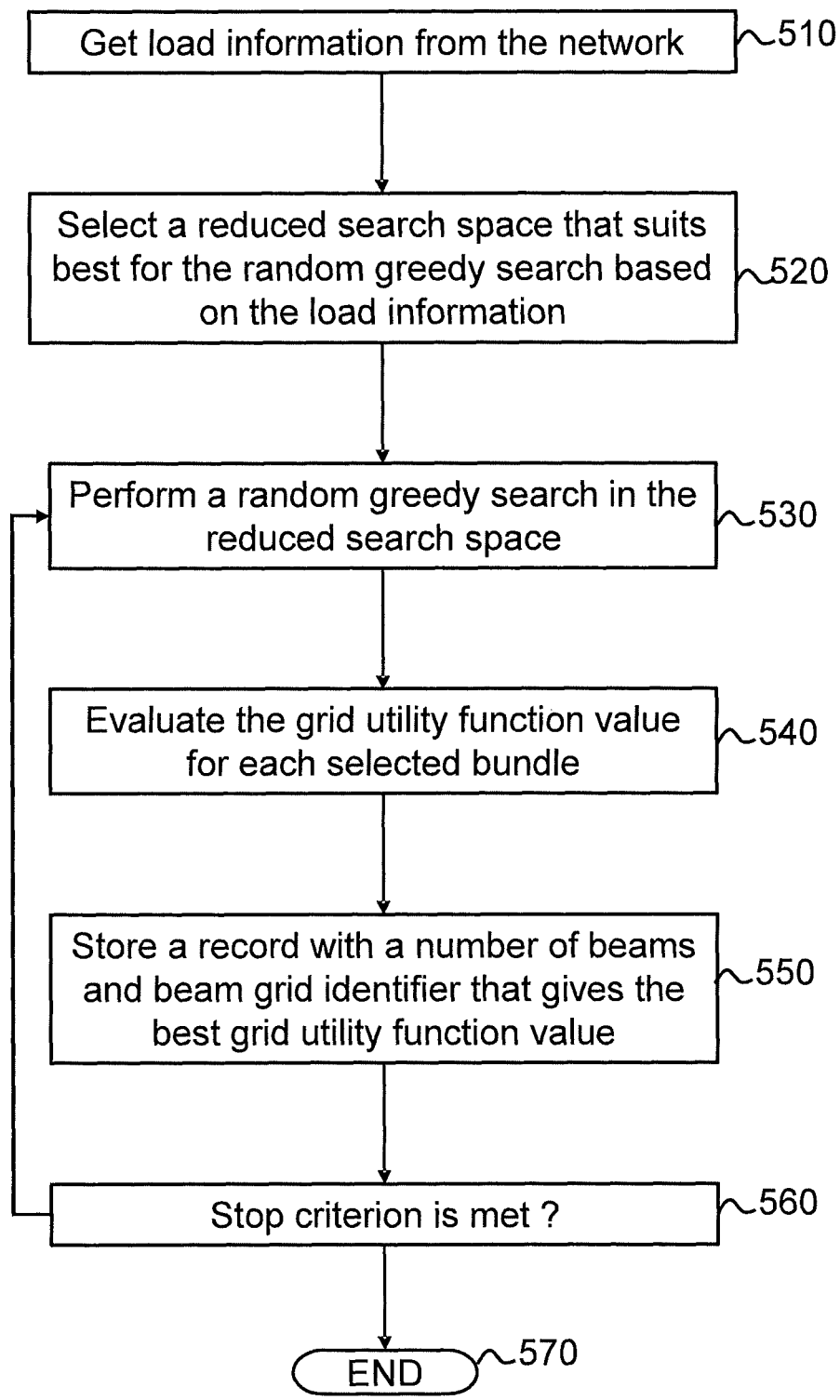
FIG. 5 shows a flowchart of a method for performing a random greedy search according to one or more example embodiments.

FIG. 5 shows a flowchart of a method for performing a random greedy search according to one or more example embodiments.

The steps of the method may be implemented by a network device according to any example described herein. While the steps are described in a sequential manner, the man skilled in the art will appreciate that some steps may be omitted, combined, performed in different order and/or in parallel.

In step 510, load information is obtained from the network. A load level may be determined based on the load information.

In step 520, a reduced search space is chosen based on a subrange of beam numbers that suits best for the random greedy search based on the load information. The best of beam numbers may be selected based on records stored in association with a load level.

In step 530, a random greedy search is performed in the reduced search space to select one or more bundles.

In step 540, for the selected bundle(s), the grid utility function value is evaluated.

In step 550, a record with a number of beams and beam grid identifier that gives the best grid utility function value is stored.

In step 560, it is determined whether a stop criterion is met. For example, the stop criterion is met when a maximum number of randomly selected beam grids has been selected. For example, the stop criterion is met when a given percentage of beam grids have been selected. For example, the stop criterion is met when a given time has been consumed for performing the random selection of the beam grids. Several stop criterions may be combined. If the one or more stop criterions are met, the method ends with step 570. Otherwise the step 530 is executed again after step 560 to continue the random search.

Figure 6:
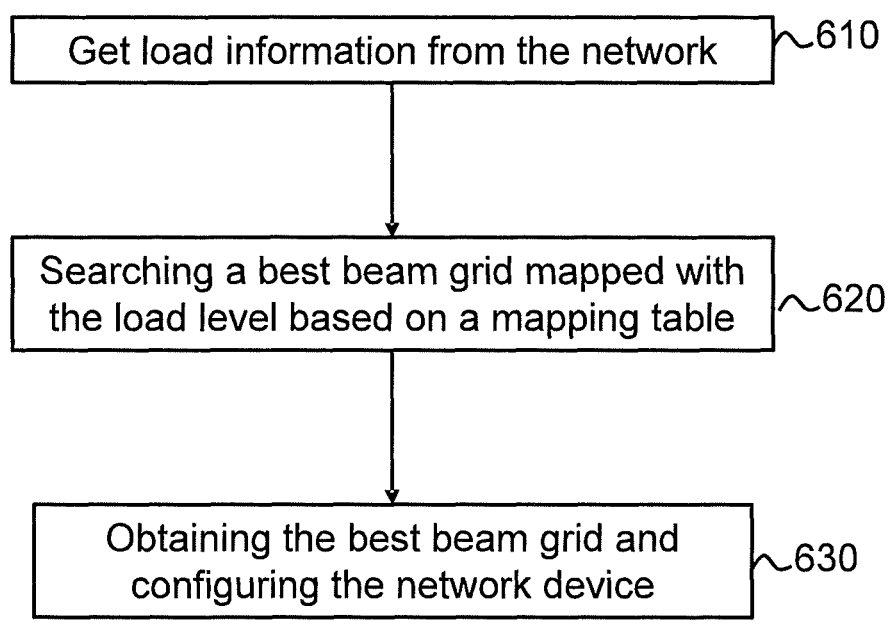
FIG. 6 shows a flowchart of a method for selecting a best beam grid according to one or more example embodiments.

FIG. 6 shows a flowchart of a method for selecting a best beam grid according to one or more example embodiments.

The steps of the method may be implemented by a network device according to any example described herein. While the steps are described in a sequential manner, the man skilled in the art will appreciate that some steps may be omitted, combined, performed in different order and/or in parallel.

In step 610, load information is obtained from the network. A load level may be determined based on the load information.

In step 620, a mapping table associated with the load level is searched to find a best beam grid mapped with the load level. Alternatively a random greedy search is performed again in a reduced search space associated with the load level based on current beam utility function values to find a beam grid with the best grid utility function value.

In step 630, the best beam grid is obtained and used to configure a network device.

The method may be implemented for radio telecommunication systems, including a fifth generation (5G) network or 6G network. Prior or subsequent generations of radio telecommunication systems may be concerned by the beam optimization methods as disclosed herein.

An access node may be any type of base station (eNB, gNB, gNB-DU, gNB-CU, etc). At least part of the functionalities of the access node may also be carried out by a network device (like a network node, a server, a gateway, etc) which is operably coupled to a transceiver (such as a remote radio head for example) and which may include other functions (such as an OAM function or another network function that may be used for implementing features in a NWDAF, Network Data Analytics Function, etc).

A user equipment, UE, (or user terminal, user device) may refer to a computing device that includes wireless mobile communication devices operating with or without a subscriber identification module (SIM), including, but not limited to, the following types of devices: a mobile station (MS), a mobile phone, a radio cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples.

Compared to the heuristic beam grid, the proposed beam grid optimization method derives a beam grid that not only reflects the geographical UE distribution but also take into consideration the antenna hardware distortion in real network, by measuring beams using the UE beam reporting collected from the real network.

By random selection of beam grids and evaluation of the selected beam grids, the best beam grid (with best grid utility function value) is approached, within which the empty beams may be combined to save system overhead in terms of reference signal resource and beam sweeping latency in beam management.

The proposed beam grid optimization method can be applied starting from any beam grid (e.g. uniform DFT beam grid) and does not require long training stage as reinforcement learning method needs. It is approaching to the best beam grid in real time and a stop criterion can be used to limit the time consumed by the random greedy search and/or evaluation of the grid utility function values.

It should be appreciated by those skilled in the art that any functions, engines, block diagrams, flow diagrams, state transition diagrams, flowchart and/or data structures described herein represent conceptual views of illustrative circuitry embodying the principles of the invention. Similarly, it will be appreciated that any flow charts, flow diagrams, state transition diagrams, pseudo code, and the like represent various processes.

Although a flow chart may describe operations as a sequential process, many of the operations may be performed in parallel, concurrently or simultaneously. Also some operations may be omitted, combined or performed in different order. A process may be terminated when its operations are completed but may also have additional steps not disclosed in the figure or description. A process may correspond to a method, function, procedure, subroutine, subprogram, etc. When a process corresponds to a function, its termination may correspond to a return of the function to the calling function or the main function.

Each described function, engine, block, step described herein can be implemented in hardware, software, firmware, middleware, microcode, or any suitable combination thereof.

When implemented in software, firmware, middleware or microcode, instructions to perform the necessary tasks may be stored in a computer readable medium that may be or not included in a host apparatus. The instructions may be transmitted over the computer-readable medium and be loaded onto the apparatus. The instructions are configured to cause the apparatus to perform one or more functions disclosed herein. For example, as mentioned above, according to one or more examples, at least one memory may include or store instructions, the at least one memory and the instructions may be configured to, with at least one processor, cause the apparatus to perform the one or more functions. Additionally, the processor, memory and instructions, serve as means for providing or causing performance by the apparatus of one or more functions disclosed herein.

The apparatus may be a general-purpose computer and/or computing system, a special purpose computer and/or computing system, a programmable processing apparatus and/or system, a machine, etc. The apparatus may be or include or be part of: a user equipment, client device, mobile phone, laptop, computer, network element, data server, network resource controller, network apparatus, router, gateway, network node, computer, cloud-based server, web server, application server, proxy server, etc.

Figure 7:
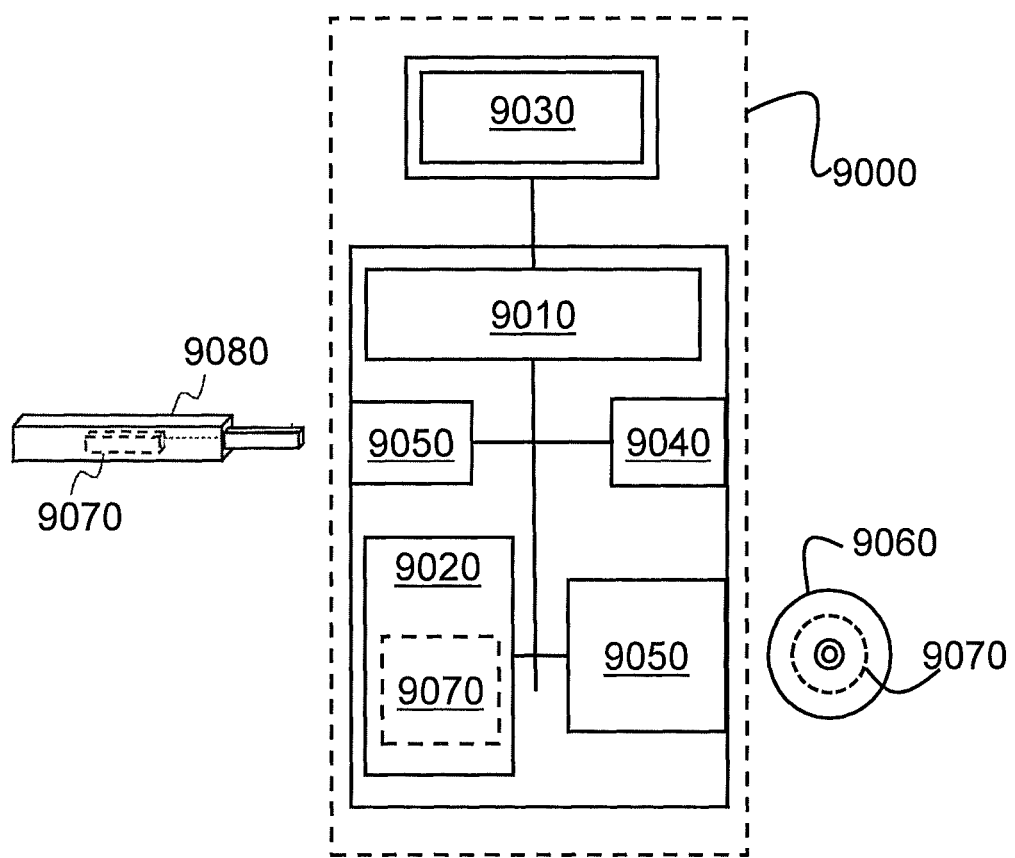
FIG. 7 is a block diagram illustrating an exemplary hardware structure of an apparatus according to an example.

FIG. 7 illustrates an example embodiment of an apparatus 9000. The apparatus 9000 may be a network device or be part of a network device as disclosed herein. The apparatus 9000 may be used for performing one or more or all steps of any method disclosed herein.

As represented schematically, the apparatus 9000 may include at least one processor 9010 and at least one memory 9020. The apparatus 9000 may include one or more communication interfaces 9040 (e.g. network interfaces for access to a wired/wireless network, including Ethernet interface, WIFI interface, etc) connected to the processor and configured to communicate via wired/non wired communication link(s). The apparatus 9000 may include user interfaces 9030 (e.g. keyboard, mouse, display screen, etc) connected with the processor. The apparatus 9000 may further include one or more media drives 9050 for reading a computer-readable storage medium (e.g. digital storage disc 9060 (CD-ROM, DVD, Blue Ray, etc), USB key 9080, etc). The processor 9010 is connected to each of the other components 9020, 9030, 9040, 9050 in order to control operation thereof.

The memory 9020 may include a random access memory (RAM), cache memory, non-volatile memory, backup memory (e.g., programmable or flash memories), read-only memory (ROM), a hard disk drive (HDD), a solid state drive (SSD) or any combination thereof. The ROM of the memory 9020 may be configured to store, amongst other things, an operating system of the apparatus 9000 and/or one or more computer program code of one or more software applications. The RAM of the memory 9020 may be used by the processor 9010 for the temporary storage of data.

The processor 9010 may be configured to store, read, load, execute and/or otherwise process instructions 9070 stored in a computer-readable storage medium 9060, 9080 and/or in the memory 9020 such that, when the instructions are executed by the processor, causes the apparatus 9000 to perform one or more or all steps of a method described herein for the concerned apparatus 9000.

The instructions may correspond to program instructions or computer program code. The instructions may include one or more code segments. A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

When provided by a processor, the functions may be provided by a single dedicated processor, by a single shared processor, or by a plurality of individual processors, some of which may be shared. The term "processor" should not be construed to refer exclusively to hardware capable of executing software and may implicitly include one or more processing circuits, whether programmable or not. A processor or likewise a processing circuit may correspond to a digital signal processor (DSP), a network processor, an application specific integrated circuit (ASIC), a field programmable gate array (FPGA), a System-on-Chips (SoC), a Central Processing Unit (CPU), an arithmetic logic unit (ALU), a programmable logic unit (PLU), a processing core, a programmable logic, a microprocessor, a controller, a microcontroller, a microcomputer, a quantum processor, any device capable of responding to and/or executing instructions in a defined manner and/or according to a defined logic. Other hardware, conventional or custom, may also be included. A processor or processing circuit may be configured to execute instructions adapted for causing the host apparatus to perform one or more functions disclosed herein for the host apparatus.

A computer readable medium or computer readable storage medium may be any tangible storage medium suitable for storing instructions readable by a computer or a processor. A computer readable medium may be more generally any storage medium capable of storing and/or containing and/or carrying instructions and/or data. The computer readable medium may be a non-transitory computer readable medium. The term "non-transitory", as used herein, is a limitation of the medium itself (i.e., tangible, not a signal) as opposed to a limitation on data storage persistency (e.g., RAM vs. ROM).

A computer-readable medium may be a portable or fixed storage medium. A computer readable medium may include one or more storage device like a permanent mass storage device, magnetic storage medium, optical storage medium, digital storage disc (CD-ROM, DVD, Blue Ray, etc), USB key or dongle or peripheral, a memory suitable for storing instructions readable by a computer or a processor.

A memory suitable for storing instructions readable by a computer or a processor may be for example: read only memory (ROM), a permanent mass storage device such as a disk drive, a hard disk drive (HDD), a solid state drive (SSD), a memory card, a core memory, a flash memory, or any combination thereof.

In the present description, the wording "means configured to perform one or more functions" or "means for performing one or more functions" may correspond to one or more functional blocks comprising circuitry that is adapted for performing or configured to perform the concerned function(s). The block may perform itself this function or may cooperate and/or communicate with other one or more blocks to perform this function. The "means" may correspond to or be implemented as "one or more modules", "one or more devices", "one or more units", etc. The means may include at least one processor and at least one memory including computer program code, wherein the at least one memory and the computer program code are configured to, with the at least one processor, cause an apparatus or system to perform the concerned function(s).

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device.

The term circuitry may cover digital signal processor (DSP) hardware, network processor, application specific integrated circuit (ASIC), field programmable gate array (FPGA), etc. The circuitry may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The circuitry may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via one or more communication networks.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

LIST OF MAIN ABBREVIATIONS

BS Base Station
CU Centralized Unit
DU Distributed Unit
gNB gNodeB (NR base station)
KPI Key Performance Indicator
LTE Long Term Evolution
NR New Radio
OAM Operation, Administration, Maintenance
RAN Radio Access Network
RAT Radio Access Technology
RF Radio Frequency
UE User Equipment

The invention claimed is:
1. An apparatus, comprising:
at least one processor; and
at least one memory storing instructions that, when executed with the at least one processor, cause the apparatus to perform:
obtaining information representative of a current network state;
selecting a beam grid in a plurality of candidate beam grids supported with a network device based on the current network state and current beam utility function values determined for one or more beams in the plurality of candidate beam grids, wherein selecting comprise performing a random greedy search in the plurality of candidate beam grids, at least by randomly selecting beam grids in the plurality of candidate beam grids, to identify and select a beam grid that meets an optimization criterion based on the current beam utility function values; and configuring the network device with the selected beam grid.

2. The apparatus of claim 1 wherein a current beam utility function value of a considered beam in the one or more beams is based on at least one of one or more performance measures or beam reports obtained for the considered beam.

3. The apparatus of claim 1 wherein a current beam utility function value of a beam of the one or more beams is based on at least one of: a reference signal received power measured with a user equipment for the beam, a signal-to-interference-plus-noise ratio reported for the beam with a beam index, a number of user equipments reporting the beam, or quality of service requirements of the user equipment reporting the beam.

4. The apparatus of claim 1, wherein the instructions, when executed with the at least one processor, cause the apparatus to perform:
computing current grid utility function values for the randomly selected beam grids, wherein a current grid utility function value of a randomly selected beam grid is obtained based on one or more current beam utility function values obtained for the one or more beams included in the randomly selected beam grid; and
identifying, among the randomly selected beam grids, the selected beam grid that meets the optimization criterion based on the grid utility function values.

5. The apparatus of claim 4, wherein the instructions, when executed with the at least one processor, compute the current grid utility function value of the beam grid as a function of the current beam utility function values obtained for the one or more beams included in a considered beam grid.

6. The apparatus of claim 4, wherein the instructions, when executed with the at least one processor, cause the apparatus to perform:
obtaining records associated with the current network state, the records including grid utility function values and corresponding identifiers of beam grids randomly selected during at least one prior random greedy search performed for the same network state; and
selecting, in the records, a reduced subset of candidate beam grids having the best grid utility function values;
wherein randomly selecting beam grids is performed with randomly selecting beam grids in the reduced subset.

7. The apparatus of claim 6, wherein the instructions, when executed with the at least one processor, cause the apparatus to perform:
updating the records associated with the current network state with storing a record including a beam grid identifier of a randomly selected beam in association with a grid utility function value determined for the randomly selected beam when the grid utility function value is better than the best grid utility function value obtained during the at least one prior random greedy search.

8. The apparatus of claim 4 wherein the instructions, when executed with the at least one processor, cause the apparatus to perform:
randomly merging or splitting beams of a set of beams supported with the network device to select a first beam grid; and
repeating the randomly merging or splitting to select further beam grids until at least one stop criterion is met;

wherein the at least one stop criterion is met when at least one of a given percentage or number of beam grids have been selected or when a given time has been consumed for performing the random selection of the beam grids.

9. The apparatus of claim 1, wherein the plurality of candidate beam grids is a reduced subset of a set of all beam grids supported with the network device, wherein the reduced subset is specific to the current network state.

10. The apparatus of claim 1, wherein the instructions, when executed with the at least one processor, cause the apparatus to perform:
determining, on the basis of the current network state, a subrange of a range of numbers of beams between one and a maximum number of beams supported with the network device;
wherein the randomly selected beam grids are selected in a reduced subset of beam grids having a number of beams in the subrange.

11. The apparatus of claim 1, wherein the instructions, when executed with the at least one processor, cause the apparatus to perform:
monitoring network state to detect a change of the network state;
when a change of network state is detected, selecting a new beam grid in the plurality of candidate beam grids based on new beam utility function values determined for one or more beams in the plurality of candidate beam grids; and
configuring the network device with the new beam grid.

12. A method, comprising:
obtaining information representative of a current network state;
selecting a beam grid in a plurality of candidate beam grids supported with a network device based on the current network state and current beam utility function values determined for one or more beams in the plurality of candidate beam grids, wherein selecting comprise performing a random greedy search in the plurality of candidate beam grids, at least by randomly selecting beam grids in the plurality of candidate beam grids, to identify and select a beam grid that meets an optimization criterion based on the current beam utility function values; and
configuring the network device with the selected beam grid.

13. The method of claim 12, wherein a current beam utility function value of a considered beam in the one or more beams is based on at least one of one or more performance measures or beam reports obtained for the considered beam.

14. The method of claim 12, wherein a current beam utility function value of a beam of the one or more beams is based on at least one of: a reference signal received power measured with a user equipment for the beam, a signal-to-interference-plus-noise ratio reported for the beam with a beam index, a number of user equipments reporting the beam, or quality of service requirements of the user equipment reporting the beam.

15. The method of claim 12, wherein performing a random greedy search includes:
computing current grid utility function values for the randomly selected beam grids, wherein a current grid utility function value of a randomly selected beam grid is obtained based on one or more current beam utility function values obtained for the one or more beams included in the randomly selected beam grid; and identifying, among the randomly selected beam grids, the selected beam grid that meets the optimization criterion based on the grid utility function values.

16. The method of claim 15, wherein the current grid utility function value of a beam grid is computed as a function of the current beam utility function values obtained for the one or more beams included in a considered beam grid.

17. The method of claim 15, wherein performing a random greedy search includes:
obtaining records associated with the current network state, the records including grid utility function values and corresponding identifiers of beam grids randomly selected during at least one prior random greedy search performed for the same network state;
selecting, in the records, a reduced subset of candidate beam grids having the best grid utility function values; and
wherein randomly selecting beam grids is performed with randomly selecting beam grids in the reduced subset.

18. The method of claim 17, comprising:
updating the records associated with the current network state with storing a record including a beam grid identifier of a randomly selected beam in association with a grid utility function value determined for the randomly selected beam when the grid utility function value is better than the best grid utility function value obtained during the at least one prior random greedy search.

19. An apparatus, comprising:
at least one processor; and
at least one memory storing instructions that, when executed with the at least one processor, cause the apparatus to perform:
obtaining information representative of a current network state;
selecting a beam grid in a plurality of candidate beam grids supported with a network device based on the current network state and current beam utility function values determined for one or more beams in the plurality of candidate beam grids, wherein the selecting comprises:
randomly selecting beam grids in the plurality of candidate beam grids;
computing current grid utility function values for the randomly selected beam grids, wherein a current grid utility function value of a randomly selected beam grid is obtained based on one or more current beam utility function values obtained for the one or more beams included in the randomly selected beam grid; and
identifying, among the randomly selected beam grids, a beam grid that meets an optimization criterion based on the grid utility function values; and
configuring the network device with the selected beam grid.

* * * * *